United States Patent
Fatehi et al.

(10) Patent No.: US 12,234,165 B2
(45) Date of Patent: Feb. 25, 2025

(54) PROCESS FOR PRODUCING CATIONIC LIGNIN COPOLYMER UNDER AQUEOUS ACID CONDITIONS

(71) Applicants: FPInnovations, Pointe-Claire (CA); LAKEHEAD UNIVERSITY, Thunder Bay (CA)

(72) Inventors: Pedram Fatehi, Thunder Bay (CA); Shoujuan Wang, Jinan (CN); Jacquelyn Price, Port Burwell (CA); Naceur Jemaa, Pointe-Claire (CA); Talat Mahmood, Kirkland (CA); Michael Paleologou, Beaconsfield (CA)

(73) Assignees: FPInnovations, Pointe-Claire (CA); LAKEHEAD UNIVERSITY, Thunder Bay (CA)

( * ) Notice: Subject to any disclaimer, the term of this patent is extended or adjusted under 35 U.S.C. 154(b) by 187 days.

(21) Appl. No.: 16/492,201

(22) PCT Filed: Mar. 7, 2018

(86) PCT No.: PCT/CA2018/050269
§ 371 (c)(1),
(2) Date: Sep. 9, 2019

(87) PCT Pub. No.: WO2018/161164
PCT Pub. Date: Sep. 13, 2018

(65) Prior Publication Data
US 2021/0198434 A1    Jul. 1, 2021

Related U.S. Application Data

(60) Provisional application No. 62/468,981, filed on Mar. 9, 2017.

(51) Int. Cl.
*C02F 1/56*     (2023.01)
*C02F 11/147*   (2019.01)
(Continued)

(52) U.S. Cl.
CPC .............. *C02F 1/56* (2013.01); *C02F 11/147* (2019.01); *C08F 289/00* (2013.01); *C08H 6/00* (2013.01); *C08K 3/32* (2013.01); *C08K 2003/324* (2013.01)

(58) Field of Classification Search
CPC .............................. C08H 6/00; C08F 289/00
See application file for complete search history.

(56) References Cited

U.S. PATENT DOCUMENTS 2,464,828 A   2/1944  Pollak et al.
4,871,825 A  10/1989  Li
(Continued)

FOREIGN PATENT DOCUMENTS

CA   2330117   6/1999
CA   2409605  11/2001
(Continued)

OTHER PUBLICATIONS

Giroux et al. (Applied and Environmental Microbiology, Dec. 1988, p. 3064-3070) (Year: 1988).*
(Continued)

*Primary Examiner* — Liam J Heincer
(74) *Attorney, Agent, or Firm* — NORTON ROSE FULBRIGHT CANADA LLP (57) ABSTRACT

A water-based process was developed for the synthesis of aminated lignin copolymers with high MW, thermal stability and solubility in water over a wide range of pH values. The cationic lignin copolymer described herein comprises: a grafting ratio of (weight of cationic amine compound)/(weight of lignin) of 70 to 200% and a charge density of +1.4-3.0 meq/g. This cationic lignin copolymer can be used as a flocculant in numerous wastewater streams including municipal and industrial systems and sludge dewatering in the pulp & paper, mining and oil industries.

12 Claims, 9 Drawing Sheets

(51) Int. Cl.
*C08F 289/00* (2006.01)
*C08H 7/00* (2011.01)
*C08K 3/32* (2006.01)

(56) References Cited

U.S. PATENT DOCUMENTS

| | | | |
|---|---|---|---|
| 4,940,764 A | 6/1990 | Meister | |
| 5,028,271 A * | 7/1991 | Huddleston | C04B 24/18 |
| | | | 106/720 |
| 5,138,007 A * | 8/1992 | Meister | C08F 289/00 |
| | | | 527/400 |
| 5,647,956 A * | 7/1997 | Elliott | D21H 17/23 |
| | | | 162/163 |
| 5,741,875 A * | 4/1998 | Meister | C08H 6/00 |
| | | | 435/911 |
| 5,846,436 A * | 12/1998 | Chen | C09D 7/71 |
| | | | 210/730 |
| 6,335,403 B1 * | 1/2002 | Shimizu | C08F 2/004 |
| | | | 526/346 |
| 6,593,460 B1 * | 7/2003 | Huttermann | C08H 6/00 |
| | | | 530/505 |
| 8,075,637 B2 * | 12/2011 | Gizaw | A61K 8/9794 |
| | | | 8/137 |
| 8,486,224 B2 | 7/2013 | Tomani et al. | |
| 8,771,464 B2 | 7/2014 | Kouisni et al. | |
| 2007/0260046 A1 * | 11/2007 | Tomita | C08H 6/00 |
| | | | 530/500 |
| 2014/0329999 A1 * | 11/2014 | Friedl | B01D 61/027 |
| | | | 530/500 |
| 2014/0342171 A1 * | 11/2014 | Al-Hellani | C08L 33/08 |
| | | | 428/514 |
| 2019/0150354 A1 * | 5/2019 | Vernay | C09D 103/02 |
| 2020/0040142 A1 * | 2/2020 | Di Ronza | C08L 9/06 |
| 2020/0040143 A1 * | 2/2020 | Fatehi | C08L 97/005 |

FOREIGN PATENT DOCUMENTS

| | | |
|---|---|---|
| CN | 106589257 | 4/2017 |
| EP | 0442508 | 8/1991 |
| GB | 847602 | 9/1960 |

OTHER PUBLICATIONS

Kouisini et al. Journal of Science & Technology for Forest Products and Process, 2012, 2 (4), 6-10.
Kouisni et al. 6th NWBC Conference Proceedings, Helsinki, Finland, Oct. 20-22, 2015, p. 193-199.
Fang et al. Bioresource Technol., 2010, 101 (19), 7323-7329.
Du et al. Ind. Crop. Prod. 2014, 52, 729-735.
Jiao et al. Tenside Surfact. Det., 2010, 4796), 381-384.
Kong et al. Eur. Polym. J., 2015, 67, 335.
Ren et al. Corros. Sci. 2008, 50(11), 3147.
Lu et al. Starch-Starke, 2004, 56 (3-4), 138.
Agarwal et al. J. Appl. Polym. Sci., 2013, 127(5), 3970.
Gupta et al. Suhas, 2009, 90, 2313-2342.
Li et al. "Syhtesis, Characterization of a Novel lignin-based polymer and its behavior as a coagulant aid in coagulation/ultrafiltration hybrid process", International Biodeterioration & Biodegradation, 113 (2016) 334-341.
Sabaghi et al. "Polarity of Cationic Lignin Polymers: Physicochemical Behavior in Aqueous Solutions and Suspensions", ChemSusChem 2022, 13, 4722-4734.
Sabaghi et al. "Phenomenological Changes in Lignin Following Polymerization and Its Effects on Flocculating Clay Particles", Biomacromolecules 2019, 20, 3940-3951.
Heydarifard et al. "Impact of Counter Ions of Cationic Monomers on the Production and Characteristics of Chitosan-Based Hydrogel" ACS Omega 2019, 4, 15087-15096.
Hasan et al. "Synthesis and characterization of Lignin-poly(acrylamide)-poly(2-methacryloyloxyethyl) trimethyl ammonium chloride copolymer" Journal of Applied Polymer Science, 2018.
English Abstract of : "Study on Preparation of Cationic Flocculant Using Straw Lignin", Luo Yuan, CMFD Engineering Science and Technology I, No. 2, B027-193, Feb. 15, 2010.
"The Chemistry of Persulfate. I. The Kinetics and Mechanism of the Decomposition of the Persulfate Ion in Aqueous Medium", I.M. Kolthoff and I.K. Miller, Journal of the American Chemical Society, vol. 73, No. 7, pp. 3055-3059, Dec. 31, 1951.
English Abstract of : "Synthesis and Flocculation Performance of a New Quaternary Ammonium Salt of Lignin", Yang Ai-li, et al., Transactions of China Pulp and Paper, vol. 23, No. 2, pp. 60-63, Jun. 15, 2008.

* cited by examiner

PROCESS FOR PRODUCING CATIONIC LIGNIN COPOLYMER UNDER AQUEOUS ACID CONDITIONS

CROSS-REFERENCE TO RELATED APPLICATIONS

The present application is a U.S. National Phase of International Application No. PCT/CA2018/050269, filed on Mar. 7, 2018, and claiming priority from U.S. Provisional Application No. 62/468,981 filed Mar. 9, 2017, the content of which is hereby incorporated by reference in its entirety.

TECHNICAL FIELD

The present relates to copolymerization of kraft lignin to produce a water soluble polymer that is useful as a flocculant for wastewater treatment and other applications.

BACKGROUND

Lignin represents the largest reservoir of natural aromatic compounds available on earth. Softwoods, hardwoods and non-woods are composed of about 25-35 wt. %, 15-25 wt. % and 15-20 wt. % lignin, respectively. During alkaline pulping processes (e.g. soda and kraft processes), the lignin is chemically broken down and partially separated from the carbohydrate portion of the furnish. Following pulping, lignin and other residual chemicals are removed from the fibers through washing with water or evaporator condensates. The washing filtrate, usually referred to as weak black liquor (WBL), is usually concentrated from about 20 wt. % to about 70 wt. % solids through evaporation and then fired into the recovery boiler to produce steam, electricity and pulping chemicals for internal mill use. As many chemical pulp mills have been increasing pulp production over the last 30 years, the recovery boiler has, in several cases, become the production bottleneck. A cost-effective way of offloading the recovery boiler with respect to calorific load is to remove a portion of the lignin from the black liquor. For every tonne of lignin that is removed, a typical chemical pulp mill can produce an additional tonne of pulp assuming that no new bottlenecks are uncovered elsewhere in the mill. Furthermore, such mills can generate additional revenue by selling the lignin for use as a cost-effective, renewable substitute for petroleum-based chemicals and materials in several low-, medium- and high-value applications.

Several processes exist for the recovery of lignin from black liquor. These include: the Westvaco process developed over 60 years ago (Pollak et al., U.S. Pat. No. 2,464,828, 1949), the LignoBoost™ process, developed by STFI (now called Innventia) and licensed to Valmet (Tomani et al., U.S. Pat. No. 8,486,224, Jul. 13, 2013) and the LignoForce System™ jointly developed by FPInnovations and NORAM (Kouisni and Paleologou, U.S. Pat. No. 8,771,464, Jul. 8, 2014). In these processes, black liquor acidification is predominantly performed by using either carbon dioxide or a mineral acid (e.g. sulphuric acid) or a combination of the two to drop the pH of the black liquor from about 13-14 to about 10 (pKa of phenolic hydroxyl groups), at which pH, lignin comes out of solution in the colloidal form. The lignin colloidal suspension is then kept in a tank for the lignin colloidal particles to coagulate to a size that is easy to filter and wash. After acidification and coagulation, the lignin is then filtered to produce an unwashed lignin cake of high residual black liquor content (hereby referred to as high residual content (HRC) lignin). During the filtration of the acidified black liquor slurry, most of the inorganic compounds, low molecular weight lignin, degraded sugars, and sugar acids end up in the filtrate which is sent back to the recovery cycle—the lignin content in the HRC lignin cake is typically about 80% of the total solids. In most commercially available processes for lignin production, the HRC lignin is, subsequently, washed with acid (e.g. sulphuric acid) and water to produce a purified washed lignin product (hereby referred to as low residual content (LRC) lignin)—the lignin content in the LRC lignin cake is typically 95-98% of the total solids. A unique feature of the LignoForce™ process is that, prior to the addition of $CO_2$, the black liquor is oxidized under controlled conditions, with respect to oxygen charge, temperature and time (Kouisni and Paleologou, U.S. Pat. No. 8,771,464, 2014; Kouisni et al., Journal of Science & Technology for Forest Products and Processes, 2012, 2 (4), 6-10). Under these conditions, the chemical requirements are reduced, lignin filterability is improved and pure lignin at high solids is obtained. Another particular advantage of the LignoForce System™ is that the emission of malodorous sulphur compounds from both process and product are significantly reduced (Kouisni et al., 6th NWBC Conference Proceedings, Helsinki, Finland, Oct. 20-22, 2015, p. 193-199) hence, this system enables to the use of not only acid-washed but also unwashed lignin in various applications without having to be concerned with the generation of malodorous sulphur compounds during lignin use.

A potential value-added application for lignin that has yet to be exploited to any significant extent is in the treatment of wastewater. The wastewater treatment industry is currently growing due to the increasing demand for clean water. The market for water treatment chemicals and, in particular, poly (acrylamide) (cationic, anionic and neutral) is expected to grow from 1.38 million tonne/y to 2.2 million tonne/y by 2019 representing total annual sales of US$6.9 billion. The increasing demand for chemical wastewater treatment chemicals calls for the introduction of greener treatment options to this market, including the use of lignin-based dispersants and flocculants.

Technical lignins, however, lack both the high molecular weight (MW) and the high cationic charge density required for treating wastewater. Consequently, various modification techniques were used in the prior art to introduce positively charged groups onto the lignin backbone, the most successful being amination. The most common routes to aminated lignin have been the Mannich reaction (Fang et al., Bioresource Technol., 2010, 101 (19), 7323-7329; Du et al., Ind. Crop., Prod. 2014, 52, 729-735; Jiao et al., Tenside Surfact. Det., 2010, 47(6), 381-384) or the grafting of quaternary ammonium groups onto the lignin backbone (Kong et al., Eur. Polym. J., 2015, 67, 335). Although these reactions are able to generate positively charged lignin, organic solvents were used as reaction media, the number of charged groups on the lignin product was low at neutral pH and the molecular weight was not significantly increased. The copolymerization of lignin with functional monomers is the most promising technique for addressing these problems as this route can help enhance lignin molecular weight, the number of functional groups (i.e. charged groups) on lignin as well as water solubility. In the prior art, such modifications were conducted, exclusively, in organic solvents, including dioxane and dimethyl sulfoxide (Ren et al., Corros. Sci. 2008, 50(11), 3147; Lu et al., Starch-Starke, 2004, 56(3-4), 138; Agarwal et al., J. Appl. Polym. Sci., 2013, 127(5), 3970). However, as these solvents are often toxic and expensive, the utilization of solvent-based processes for producing lignin-based flocculants at a commercial scale is impractical.

SUMMARY

In accordance with one aspect of the present invention, there is provided a method for preparing a method for preparing a cationic lignin copolymer comprising: providing water; providing a lignin; providing at least one monomer compound, wherein the monomer compound is a cationic amine compound; and mixing the water, the lignin, and the at least one monomer compound under acidic free radical generating conditions to polymerize the lignin and at least one monomer compound in aqueous suspension and to produce the cationic lignin copolymer.

In accordance with another aspect of the present invention, there is provided the method described herein, further comprising separating and purifying reaction products comprising the water soluble lignin copolymer.

In accordance with yet another aspect of the present invention, there is provided the method described herein, wherein the separating and purifying of the reaction products is by nanofiltration and/or ultrafiltration.

In accordance with still another aspect of the present invention, there is provided the method described herein, wherein a recovery of the cationic lignin copolymer is greater than 80% in the nanofiltration and/or ultrafiltration.

In accordance with yet still another aspect of the present invention, there is provided the method described herein, wherein the cationic amine compound is selected from the group consisting of: N,N-dimethyldiallyl ammonium chloride (DADMAC); N,N'-methylenebisacrylamide; [2-(Methacryloyloxy)ethyl] trimethylammonium chloride (METAC), [3-(Methacryloylamino)propyl] trimethylammonium chloride (MAPTAC), [2-(Acryloyloxy)ethyl]trimethyl ammonium chloride (ATAC) and [2-(Methacryloyloxy)ethyl] trimethyl ammonium methyl sulfate (METAM).

In accordance with a further aspect of the present invention, there is provided the method described herein, wherein the cationic lignin copolymer comprises comonomers selected from the group consisting of methyl methacrylate, acrylamide, vinyl acetate, and combinations thereof.

In accordance with yet a further aspect of the present invention, there is provided the method herein described, wherein the cationic amine compound is [2-(Methacryloyloxy)ethyl]trimethylammonium chloride (METAC).

In accordance with still a further aspect of the present invention, there is provided the method described herein, wherein the acidic free radical generating conditions are in aqueous solution with an acid and at least one of a free radical initiator, a UV light, and microwaves.

In accordance with yet still a further aspect of the present invention, there is provided the method described herein, the free radical initiator is sodium persulphate or potassium persulphate.

In accordance with one embodiment of the present invention, there is provided the method described herein, wherein the pH of the acidic free radical generation conditions is from 2 to 7.

In accordance with another embodiment of the present invention, there is provided the method described herein, wherein the pH is 3 to 4.

In accordance with yet another embodiment of the present invention, there is provided the method described herein, wherein the lignin is an acid washed low residual content lignin or an unwashed high residual content lignin.

In accordance with still another embodiment of the present invention, there is provided the method described herein, wherein the lignin is the unwashed high residual content lignin.

In accordance with a further embodiment of the present invention, there is provided a cationic lignin copolymer comprising: a grafting ratio of (weight of a cationic amine compound)/(weight of lignin) of 70-200%; a charge density of +1.4-3.0 meq/g; and a 100% solubility in water over a pH range of 0 to 14.

In accordance with yet still another embodiment of the present invention, there is provided the method described herein, wherein the cationic amine compound is METAC.

In accordance with yet a further embodiment of the present invention, there is provided the cationic lignin copolymer described herein, wherein the grating ratio is 150 to 200%.

In accordance with yet another embodiment of the present invention, there is provided the method described herein, wherein the molecular weight is $1.3 \times 10^6$ to $1.5 \times 10^6$ g/mol.

In accordance with still another embodiment of the present invention, there is provided the method described herein, wherein the charge density is +2.5 to 3.0 meq/g.

In accordance with yet another embodiment of the present invention, there is provided the method described herein, wherein the 100% solubility is over the pH range of 3 to 10.

In accordance with another object of the present invention, there is provided the method of flocculating wastewater by adding the cationic lignin copolymer described herein.

In accordance with yet another object of the present invention, there is provided the method described herein, wherein the wastewater is industrial wastewater and/or municipal wastewater.

In accordance with still another object of the present invention, there is provided the method described herein, wherein the industrial wastewater is from the textile dye, pulp and paper, mining or oil industries.

In accordance with yet still another object of the present invention, there is provided the method described herein, wherein the cationic lignin copolymer is used to help dewater sludge from industrial wastewaters.

DETAILED DESCRIPTION

Lignin possesses several functional groups including phenolic hydroxyl, aliphatic hydroxyl, and carboxylic hydroxyl groups as well as free positions on the aromatic rings. These reactive groups can be used for modifying lignin via esterification, etherification, sulfonation, chlorination and graft copolymerization for the purpose of producing value-added products. As mentioned above, the cationic modification of lignin by the Mannich reaction was previously conducted in solvent media. The copolymerization of lignin using various cationic monomers, such as N,N-dimethyldiallyl ammonium chloride (DADMAC), N,N'-methylenebisacrylamide and co-monomers, such as methyl methacrylate, acrylamide or vinyl acetate by free radical polymerization were also investigated.

It has been found, in accordance with this invention, that kraft lignin can be copolymerized under aqueous conditions with a monomer compound using a free radical suspension polymerization approach producing a highly water-soluble kraft lignin-based copolymer.

A water soluble lignin copolymer is a copolymer comprising a linked lignin portion and a polymer portion and having a solubility of at least 1 g/100 mL of water, this solubility value is understood as 100% solubility, and is a common measure for copolymers.

The monomer compound is in a preferred embodiment a cationic amine compound. Where in a preferred embodiment the cationic compound is one of N,N-dimethyldiallyl ammonium chloride (DADMAC); N,N'-methylenebisacrylamide; [2-(Methacryloyloxy)ethyl]trimethylammonium chloride] (METAC), which may be used along with a comonomer of methyl methacrylate; acrylamide; vinyl acetate, and combinations thereof. In a particularly preferred embodiment the cationic amine is [2-(Methacryloyloxy) ethyl] trimethylammonium chloride].

Surprisingly, it was found that it is possible to prepare such copolymers at high reaction yield and selectivity, especially when HRC kraft lignin is used under acidic conditions. The chemical composition of HRC lignin as compared to LRC lignin is shown in Table 1. As seen in this table, for example, the ash content of HRC lignin could be as high as 182× the ash content of LRC lignin while the sodium content of HRC lignin could be as high as 169× the sodium content of LRC lignin.

TABLE 1

| Lignin composition | | |
|---|---|---|
|  | HRC softwood kraft lignin | LRC softwood kraft lignin |
| Ash, wt. % | 1.9-20 | 0.11-1.8 |
| pH | 3.8-10.5 | 2-3.7 |
| Organics, wt.% | 80-87.1 | 98.2-99.9 |
| Lignin, wt.% | 56.4-72.2 | 90.9-99.9 |
| Acid-insoluble lignin, wt. % | 49.9-73.6 | 89.3-97.8 |
| Acid-soluble lignin, wt. % | 1.17-6.71 | 1.25-3.88 |
| Na, wt. % | 0.12-10 | 0.059-0.9 |
| S, wt. % | 1.41-2.93 | 1.46-2.38 |
| Sugars, wt. % | 0.7-2.92 | 1.23-2.4 |
| HHV, BTU/lb | 6378-9517 | 10797-11851 |
| C, % | 47.3-58.4 | 65.8-68.1 |
| H, % | 4.4-5.9 | 5.8-6.0 |
| N, % | 0.02-0.07 | 0.03-0.04 |

Such HRC lignin-METAC copolymers demonstrated high MW, thermal stability, charge density and solubility in water. In addition, such copolymers demonstrated an exceptional ability to act as flocculants in several wastewater applications including municipal and industrial systems as well as sludge dewatering applications in the textile dye, pulp & paper, mining and oil industries.

For the purposes of this invention, cationic lignin copolymers were synthesized by the copolymerization of kraft lignin with METAC using potassium persulfate as a free radical initiator. Alternatively, sodium persulphate ($Na_2S_2O_6$) can be used to initiate the copolymerization, which is more compatible with the kraft recovery cycle of kraft pulp mills in which sodium and sulphur are the main process elements. However, it should be understood by those skilled in the art, that free radical polymerization can be induced using other approaches as well such as UV light, microwaves or enzymes, these conditions are defined herein and understood as a free radical generating condition, where a preferred embodiment is an aqueous acidic (pH<6) free radical generating condition. An acidic free radical generating condition is one that includes an aqueous solution with an acid and at least one of a free radical initiator, a UV light, and/or microwaves.

The copolymer produced was characterized using FT-IR spectroscopy, NMR spectroscopy, elemental analysis, charge density, dynamic light scattering and TGA analyses.

Kraft lignin has a low nitrogen content. Therefore, the nitrogen content of the lignin cationic amine (lignin-METAC) copolymer originated from METAC attached to lignin. Therefore, the nitrogen content of the copolymer corresponds to a grafting ratio of the cationic amine (METAC) on kraft lignin. The higher the nitrogen content, the higher the grafting ratio of the lignin copolymer obtained. An elemental analysis was conducted on all samples in order to determine the nitrogen content of the produced copolymers and to optimize the reaction conditions. The elemental analysis of the copolymer was performed with an Elementar™ vario EL elemental analyzer. The grafting ratio of cationic amine compound i.e. (METAC) to lignin was identified using the following equation. In the past, this equation was used for the grafting ratio analysis of acrylamide and enzymatically hydrolyzed lignin as well as for xylan and METAC.

$$\text{Grafting ratio, wt.\%} = \frac{\text{Weight of grafted } METAC}{\frac{N\%14 \times MM \times 100}{100 - N\%14 \times MM}} \times 100 \quad (1)$$

In the above equation, N % is the nitrogen content and MM is the molar mass of METAC (207.7 g/mol). The copolymerization of kraft lignin with 2-(Methacryloyloxy)ethyl]trimethylammonium chloride (METAC) was initially evaluated under different conditions in an effort to identify optimum conditions for the preparation of the lignin-METAC copolymers at a high yield while demonstrating the desired features for any given application. In particular, the effects of monomer to lignin ratio, temperature, concentration of the reactants and reaction time in an oxygen-free environment at a pH between 3 and 4 were evaluated. During the evaluation, for example, the inventors identified reaction conditions which produced a lignin-g-P(METAC) copolymer with the highest weight-average molecular weight ($M_w$) and grafting ratio at a pH of 4, a temperature of 80° C., a kraft lignin concentration of 0.3 mol/L, a METAC/lignin ratio of 1.6/1, a free radical initiator ($Na_2S_2O$ or $K_2S_2O_8$) charge of 1.5 wt. % and a reaction time of 3 hours. Under these conditions, a lignin-METAC copolymer with a charge density of +2.93 meq/g, a grafting ratio of 178.5% and a molecular weight of $1.53 \times 10^6$ g/mol was produced.

In addition, the analysis of the results demonstrated that conditions can be selected for the synthesis of copolymers with different portions of kraft lignin (in copolymer), different charge densities and molecular weights. In particular, the charge density and molecular weight of the product can be designed to meet the requirements of any given wastewater system and/or application. The viscosity of the copolymer product may be a limiting factor for increasing the concentration of kraft lignin and/or the MW of the copolymer produced. The main products of this copolymerization are kraft lignin-g-P(METAC), poly(METAC) and unreacted 2-(methacryloyloxy)ethyl] trimethylammonium chloride monomer. The analysis of the reaction conditions showed that if the reaction proceeded longer than 3 hours, acidic hydrolysis of the lignin-g-P(METAC) copolymer occurred, resulting in cleavage of the ether linkages between lignin and P(METAC) and an increase in P(METAC) in the reaction mixture. The thermal stability of the lignin-P(METAC) copolymer was determined to be better than that of P(METAC)—increasing the temperature to 400° C. led to the decomposition of 59% of the lignin-g-P(METAC) copolymer while 84% of the homopolymer was decomposed when heated to the same temperature. The better thermal stability of lignin-P(METAC) as compared to P(METAC) is due to the presence of kraft lignin in the co-polymer, as kraft lignin decomposes at a higher temperature than METAC.

To investigate the repeatability of the lignin-g-P(METAC) preparation method of the invention and the performance of various lignins in the copolymerization, the production of lignin copolymers under the same conditions was investigated using different softwood lignin samples. The 8 different types of lignin can be split into 3 different categories, wet (W) vs. dry (D), Mill X vs. Mill Y and HRC Lignin vs. LRC Lignin. Of the 3 different categories, there were small variations in results between wet vs. dry and between lignin extracted from two different Canadian mills (Mill X and Mill Y). Varying these factors had insignificant effects on charge density, molecular weight, residual METAC monomer, poly(METAC) and lignin-g P(METAC) copolymer yield. However, to our surprise, the evaluation showed better results when HRC lignin was used compared to LRC lignin. HRC lignin generated a copolymer with a higher yield (71%) and solubility of 100%, while LRC lignin had a copolymer yield of 24% and a solubility of 20% (at 1 wt. % concentration). In addition, when HRC lignin was used, 14% of the raw material was converted to homopolymer, whereas when LRC lignin was used, an average of 48% of the raw material was converted to the homopolymer.

The skilled person in the art would understand that a variety of lignins could be copolymerized with METAC to produce lignin-METAC copolymers with the required features with respect to MW and charge density to be used as a flocculant in a variety of industrial applications. Such lignins include but are not limited to: softwood kraft and soda lignins, hardwood kraft and soda lignins, lignins from the alkaline pulping of non-woods (all preferably in the unwashed sodium form), hydrolysis lignins of various types and lignins from organosolv processes. Such lignins also include depolymerized versions of such lignins (preferably in the sodium form).

Figure 1:
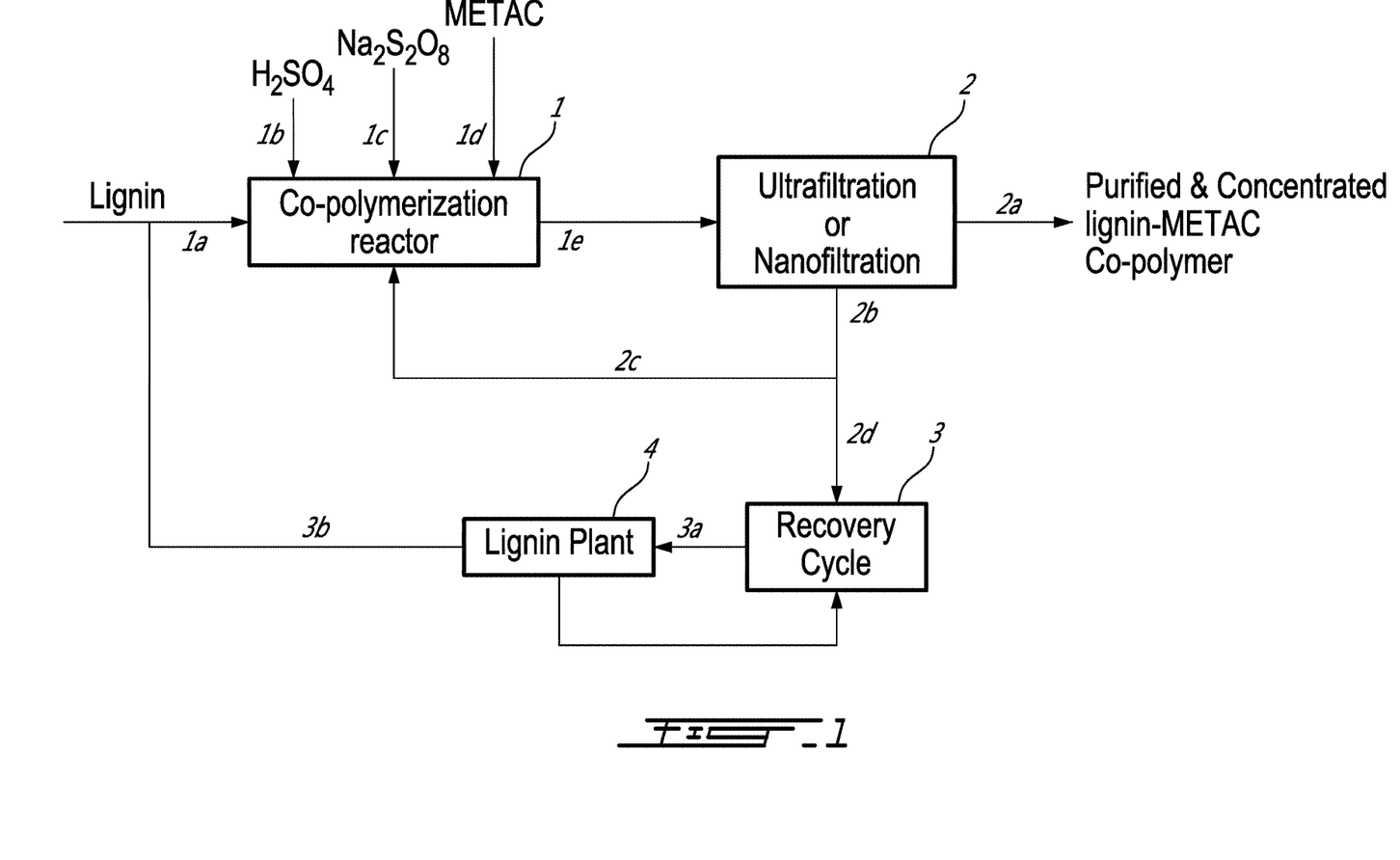
FIG. 1 is a process diagram for lignin-g-P(METAC) production according to one embodiment described herein.

With reference to FIG. 1, in one embodiment a lignin-METAC co-polymer production system comprises a co-polymerization reactor 1, an ultrafiltration and/or nanofiltration system 2, a kraft mill recovery cycle, 3 and, optionally, a lignin plant 4. Lignin from an outside source and/or lignin from an on-site lignin plant is directed via flow lines 1a and 3b to the co-polymerization reactor 1.

Water, an acid, a free radical initiator and monomer compound are added to the co-polymerization reactor 1, along flow lines 1b, 1c, and 1d, respectively. The acid 1b is in a preferred embodiment sulphuric acid. The free radical initiator 1c, is in a preferred embodiment sodium persulphate. The monomer compound 1d is in a preferred embodiment METAC. The polymerization reaction with the lignin 1a is allowed to go to completion. Once the co-polymerization reaction is completed, the reaction products are directed via flow line 1e to the ultrafiltration and/or nanofiltration system 2. The concentrate from the ultrafiltration and/or nanofiltration system, 2, is removed via flow line 2a—this represents one of the main aspects described herein in a concentrated and purified form.

The permeate from the treatment of the reaction products using ultrafiltration and/or nanofiltration system, 2 is removed via flow line 2b. To the extent possible, the permeate is recycled to the co-polymerization reactor, 1 via flow line 2c while the rest is returned to the kraft recovery cycle, 3 via flowline 2d. In mills that already have a lignin plant, 30-40% solids black liquor from the kraft recovery cycle, 3 is directed to the lignin plant, 4 for the production of lignin. The latter is directed to the co-polymerization reactor 1 via flow line 3b.

Lignin-METAC copolymers in various forms can be made using the process of this invention. Purchased lignin or lignin produced on-site using any one of the commercially available processes (e.g. Westvaco™, LignoBoost™, LignoForce™ or Liquid Lignin™) can be fed to a copolymerization reactor (e.g. a CSTR type of reactor) along with water (the reaction medium), sulphuric acid (acidifying agent), METAC monomer and sodium persulphate (free radical initiator). The lignin used could be in either the acid-washed form (LRC lignin) or, preferably, in the unwashed (HRT lignin) form. The reaction can be conducted at a pH of about 4 under the optimal conditions described above for the production of lignin-g-P(METAC) copolymer with the desired charge densities and MWs. The final product of this reaction typically has a concentration of about 15 wt. % solids. This product can be used as is (especially in the case of kraft pulp mill specific applications), or concentrated and purified using ultrafiltration and/or nanofitration to about 30-40 wt. % solids. For example, we found that it was possible to concentrate a lignin-g-P(METAC) copolymer with a charge density of +2.95 meq/g and a MW of $1.5 \times 10^6$ g/mol from 15 wt. % solids concentration to 31 wt % solids concentration using a membrane with a MW cut-off of 1000 Dalton. With such a membrane, the membrane fluxes varied from about 50-150 lmh (Liters per $m^2$ per hour) in the 50-100 psi pressure range while the polymer recovery was >80%. The permeate produced from the ultrafiltration system can, to a certain extent, be returned to the copolymerization reactor since it contains mostly unreacted residual chemicals such as METAC, sulphuric acid, sodium sulphate and sodium persulphate. The balance can be sent to the mill recovery cycle (black liquor flow) and, ultimately, burned in the mill recovery boiler. Since this stream contains organics (e.g. carbon and oxygen-based organics) and inorganics (e.g. sodium sulphate) that are fully compatible with the kraft recovery cycle, no operational problems are anticipated in any of the unit operations of the recovery cycle (e.g. evaporators, recovery boiler, causticizing system or lime kiln). Alternatively, if the Biochemical Oxygen Demand (BOD) and Chemical Oxygen Demand (COD) content of this stream is limited, it can be directed to the mill wastewater system for processing.

The application of lignin-METAC copolymers as flocculants in textile dye wastewater, pulp mill sludge dewatering, the flocculation of koalin suspensions and the treatment of tailings from the oil sands industry were evaluated. For example, the efficiency of flocculation of two textile dyes using lignin-g-PMETAC at different pH levels and charge densities was evaluated in two different simulated dye solutions (Reactive orange 16 (RO16) and Reactive Black 5 (RB5), and the results were compared with both commercially available cationic polyacrylamide (CPAM) and PMETAC generated under the optimal conditions for lignin-g-P(METAC). The flocculation of dye particles is a key step for treating wastewater from the textile industry and can be used to evaluate flocculation efficiency (Gupta et al., Suhas, 2009, 90, 2313-2342). The results showed that: a) lignin-g-P(METAC) was an efficient flocculant (up to 99% removal for RB5 and 92% for RO16) and pH had no effect on its flocculation efficiency; b) as the charge of the polymer increased, a lower dosage was required to achieve the same flocculation efficiency and c) lignin-g-P(METAC) generated comparable or better results compared to P(METAC) and CPAM.

To evaluate the impact of the purity of the lignin-g-P(METAC) copolymer product on its efficiency as a flocculant, two different scenarios were assessed: a) lignin-g-P(METAC) was precipitated from the reaction medium in ethanol and used in this form and b) the lignin-g-P(METAC) copolymer reaction product was used without purification from the reactor (i.e. the reaction medium was used as the final product). The results showed that, for RB5, a dosage of 106 ppm of unpurified lignin-g-P(METAC) was required to flocculate 99% of the dye, whereas 140 ppm of purified lignin-g-P(METAC) copolymer was needed to achieve the same results. In the case of RO16, 98 ppm of unpurified lignin-g-P(METAC) was required to remove 87% of dye, whereas 105 ppm of purified lignin-g-P(METAC) was needed to remove 92% of dye. These results suggest that: a) an impure lignin copolymer would produce better results as it contains lignin-g-P(METAC) copolymer, poly (METAC) homopolymer and unreacted METAC monomer, b) purification can be eliminated whenever not necessary, which can reduce the cost of production, and c) the process can be designed to produce different levels of purity (at different production costs) depending on the end-use applications.

Furthermore, the dewatering efficiency of lignin-g-P(METAC) was also evaluated using secondary sludge from a kraft mill. After centrifugation of sludge at 90 g, the solids content of sludge that was treated with 5000 ppm (based on solids content) of lignin-g-P(METAC) reached 14% from an initial 2% solids, which was comparable to the results obtained for treating the same sludge with the more expensive homopolymer P(DADMAC). However, the treatment of the sludge with 5000 ppm of CPAM, a polymer commonly used in sludge dewatering in the pulp & paper and other industries, led to only 10 wt. % solids content. The residual turbidity and COD of the filtrate after the treatment with lignin-g-P(METAC) were comparable with those for the sludge treated with P(DADMAC). In addition, we showed that lignin-g-P(METAC) performed better than a commercially used petroleum-derived polymer when treating an oil sands tailings sample. The lignin-derived polymer resulted in lower Capillary Suction Time (CST) values at all applied polymer dosages compared to a commercial petroleum-based product. The capillary suction time (CST) test is a commonly used method to measure the filterability and the easiness of removing moisture from slurries and sludge in numerous environmental and industrial applications.

In summary, an efficient process to produce a water-soluble aminated lignin copolymer with a high charge density and $M_w$ in an aqueous system was developed. This process can easily be integrated into a kraft pulp mill (with or without a lignin recovery system) without any major negative impact on pulp mill operations. This process is flexible since it can use as a feedstock a variety of lignin sources (e.g. softwood, hardwood, non-woods) from a variety of biomass processing operations (e.g. kraft, soda, acidic or enzymatic hydrolysis, steam explosion, depolymerisation processes etc.) at different moisture contents and degrees of purity. The products of this process can be applied as flocculants in wastewater systems and the purity of the products can be aligned with the requirements of the wastewater systems.

Example 1: Effect of pH

Figure 2:
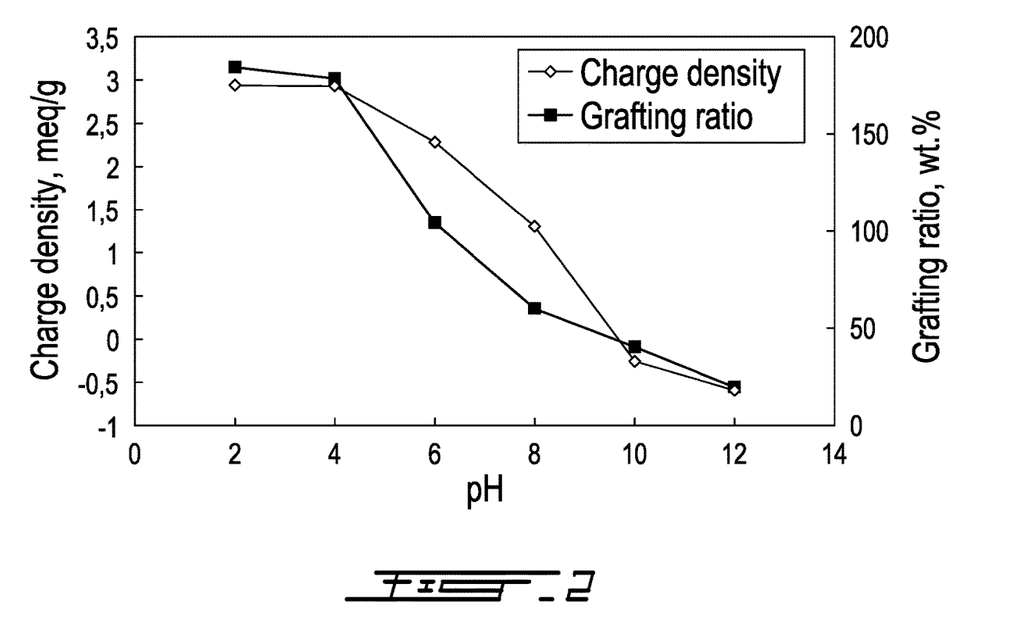
FIG. 2 is a graph of reaction pH versus charge density (meq/g) and grafting ratio (wt. %) of lignin-METAC copolymer (METAC/lignin molar ratio: 1.6, temperature: 80° C., Reaction time: 3 h, initiator charge: 1.5 wt. %, lignin concentration: 0.3 mol/L)

FIG. 2 shows the effect of reaction pH on the charge density and grafting ratio of the lignin-METAC copolymer. When the pH of the reaction mixture was increased, the charge density and grafting ratio of the lignin-METAC copolymer decreased. At pH 2.0, the charge density and grafting ratio reached the highest values of 2.94 meq/g and 184%, respectively. However, when the pH was higher than 4, the grafting ratio and charge density declined dramatically. Under alkaline conditions, the hydrogen at the β-carbon connected to the quaternary ammonium group of METAC segments can be attacked by hydroxyl ions to convert quaternary ammonium groups into tertiary ammonium groups, which results in a decrease in the charge density. Therefore, under strongly alkaline conditions, the quaternary ammonium groups of the METAC segments become unstable thereby leading to a decrease in the charge density. The results showed that lignin-METAC copolymer with the highest charge density and grafting ratio was obtained at a pH between 2 and 4. A reaction mixture with a pH close to neutral is more industrially viable, therefore, a pH of 4.0 was selected for all subsequent reactions.

Effect of METAC/Lignin Molar Ratio

Figure 3:
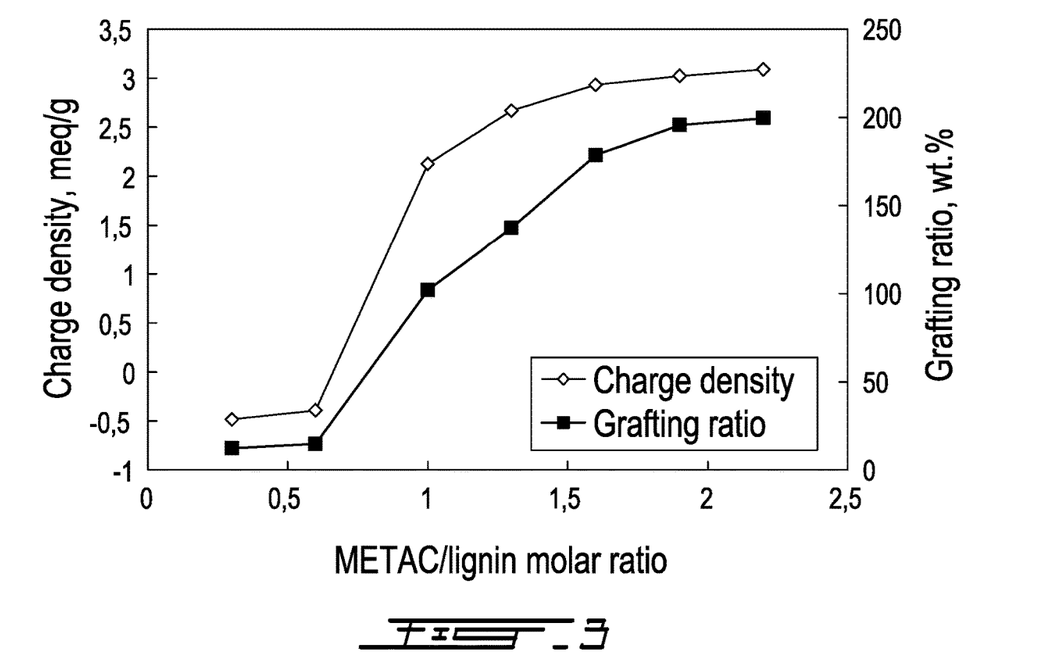
FIG. 3 is a graph of METAC/lignin molar ratio versus charge density (meq/g) and grafting ratio (wt. %) of lignin-METAC copolymer (pH: 4.0, temperature: 80° C., Reaction time: 3 hours, initiator charge: 1.5 wt. % and lignin concentration: 0.3 mol/L)

The influence of the molar ratio of METAC to lignin on the charge density and grafting ratio of lignin-METAC can be found in FIG. 3. When the METAC/lignin molar ratio was increased from 0.8 to 1.6, the charge density and grafting ratio increased significantly, however, further increasing this ratio past 1.6 did not result in an increase in charge density and grafting ratio. This behavior is attributed to the fact that a rise in METAC/lignin molar ratio increases the METAC concentration, which would react with the lignin macro radicals producing a lignin copolymer with a larger portion of P(METAC). Based on these results, a molar ratio of 1.6:1 of METAC/lignin was chosen in this investigation.

Effect of Reaction Temperature

Figure 4:
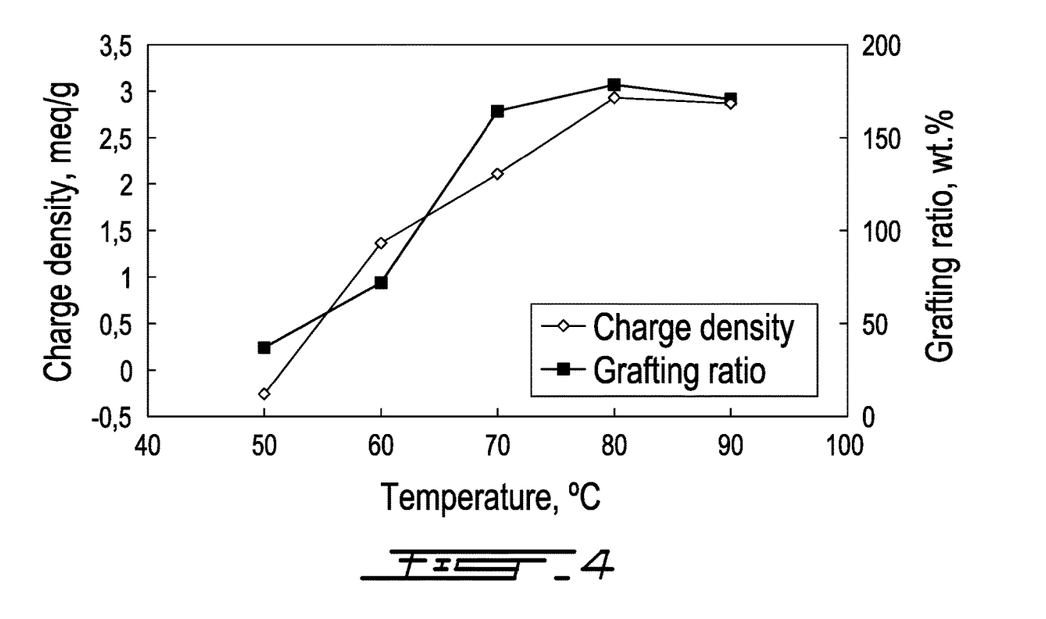
FIG. 4 is a graph of reaction temperature versus charge density (meq/g) and grafting ratio (wt. %) of lignin-METAC copolymer (METAC/lignin molar ratio: 1.6, pH: 4.0, Reaction time: 3 hours, initiator charge: 1.5 wt. % and lignin concentration: 0.3 mol/L)

The effect of reaction temperature on the charge density and grafting ratio is shown in FIG. 4. Increasing the reaction temperature from 50 to 80° C. resulted in a dramatic increase in the charge density and grafting ratio. These results suggest that the reaction was endothermic and the temperature increase generated a higher concentration of free radicals and hence a higher copolymerization rate. However, when the temperature increased from 80° C. to 90° C., no further improvement in the charge density and grafting ratio was observed. This was probably due to more chain termination and chain transfer reactions at temperatures higher than 80° C.

Effect of Reaction Time

Figure 5A:
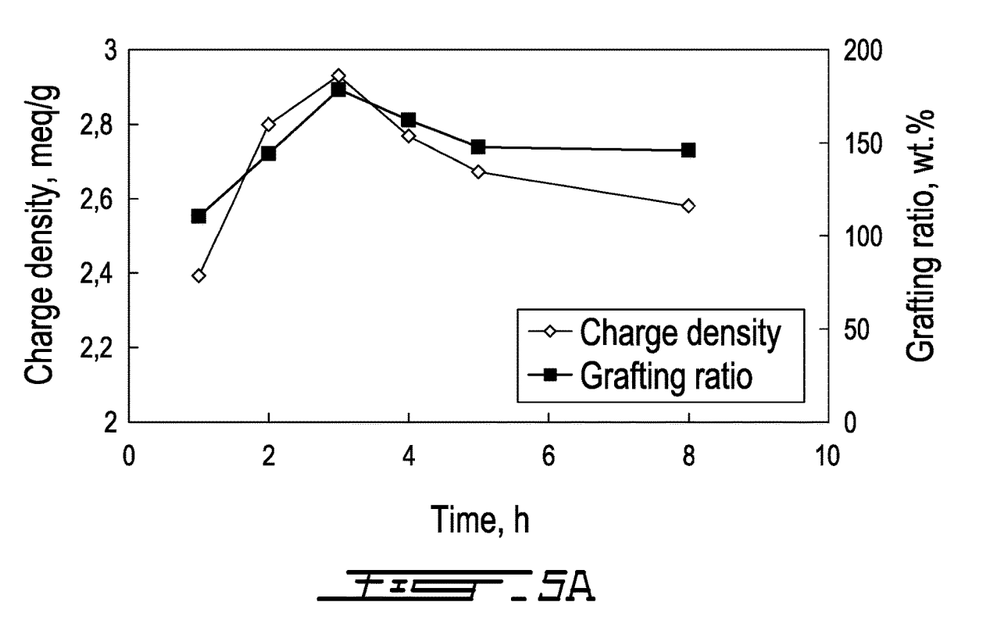
FIG. 5(A) is a graph of reaction time versus charge density (meq/g) and grafting ratio (wt. %) of lignin-METAC copolymer (METAC/lignin molar ratio: 1.6, pH: 4.0, Temperature: 80° C., initiator charge: 1.5 wt. % and lignin concentration: 0.3 mol/L)
Figure 5B:
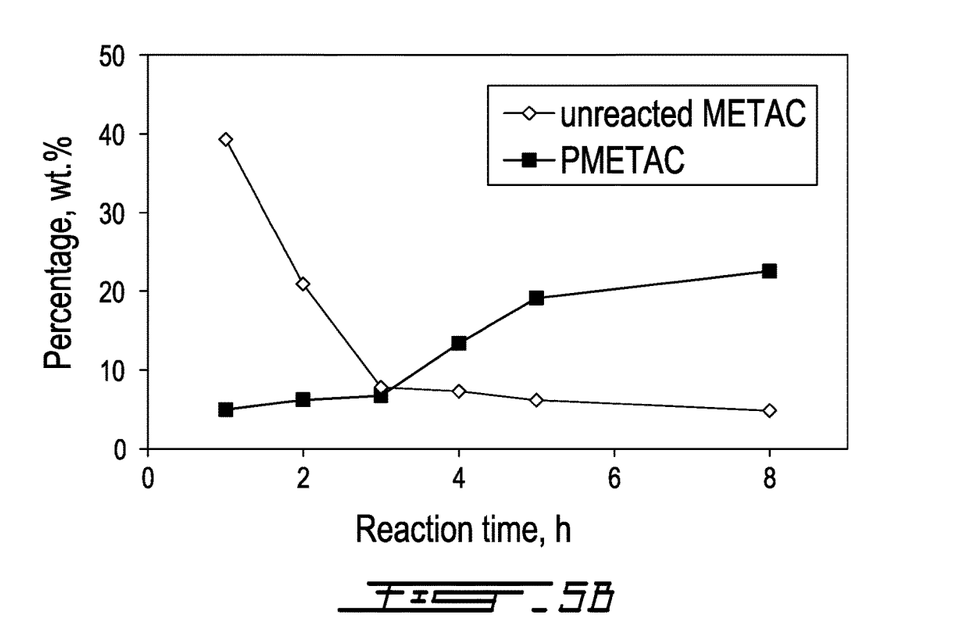
FIG. 5(B) is a graph of the generation of unreacted METAC and P(METAC) (percentage wt. %) versus reaction time (hours) (METAC/lignin molar ratio: 1.6, pH: 4.0, Temperature: 80° C., initiator charge: 1.5 wt. % and lignin concentration: 0.3 mol/L)

The effect of reaction time on the charge density and grafting ratio of lignin-METAC copolymer is seen in FIG. 5A, while the effect of time on METAC consumption and P(METAC) production can be found in FIG. 5B. To measure the amount of residual P(METAC) and METAC monomer, after precipitation of the lignin-METAC copolymer, the ethanol supernatant was collected and concentrated. The amount of lignin-METAC copolymer, $m_1$ (g/L), in the supernatants was analyzed by measuring the absorbance at 280 nm. The same supernatants were dried in an oven at 105° C. for 24 h in order to determine the total mass, $m_0$ (g/L) of the residual copolymer, monomer and P(METAC). A determined portion of the same supernatants was dialyzed for 48 h in order to remove any unreacted METAC. The solution from dialysis was then dried in an oven at 105° C. for 24 h in order to determine the mass, $m_2$ (g/L), after dialysis. The percent of unreacted METAC and P(METAC) produced in the reaction were calculated using equations (2) and (3), respectively.

$$\text{percent of unreacted } METAC = V \times \frac{m_o - m_2}{m} \times 100\% \quad (2)$$

$$\text{percent of } PMETAC = V \times \frac{m_2 - m_1}{m} \times 100\% \quad (3)$$

Where V is the total volume of supernatant collected (as measured, for example in L), and M (as measured, for example in g), is the mass of METAC used in the reaction.

The charge density and grafting ratio increased with extending the reaction time from 0.5 h to 3.0 h, and reached the highest values of 2.93 meq/g and 178.5%, respectively. The increase in the charge density and grafting ratio is attributed to the fact that with increasing reaction time, more free radicals are formed and more unreacted METAC is polymerized. The results also demonstrate that during the first 3 h of reaction, the amount of unreacted METAC decreased dramatically with a slight increase in P(METAC) (FIG. 5B). However, when the reaction time was longer than 3 h, the grafting ratio and charge density of lignin-METAC copolymer decreased, while the yield of P(METAC) increased and the amount of residual METAC monomer did not decrease significantly (FIGS. 5A and 5B).

These results suggest that the P(METAC) that was originally grafted onto the lignin-METAC copolymer was cleaved due to acidic hydrolysis through cleavage of ether linkages between lignin and P(METAC) segment. To provide further evidence that the decomposition of lignin-METAC through acid hydrolysis was in fact the cause for the higher yield of P(METAC), both lignin-METAC and P(METAC) were dissolved in water and the pH was adjusted to 4. Both solutions were then heated to 80° C. for 6 h. Upon examination by $^1$H NMR spectroscopy, the amount of METAC in the lignin-METAC copolymer was reduced by 21% and the $M_w$ decreased from $1.53 \times 10^6$ g/mol to $1.32 \times 10^6$ g/mol. Upon examining P(METAC) after being exposed to acidic conditions for an extended period of time, no change in charge density or $M_w$ was observed. This confirms that the decrease in the charge density and grafting ratio was due to the cleavage of ether linkages between lignin and the P(METAC) portion of the copolymer, and not to the ester linkage in METAC.

Based on the above experiments, we determined that the optimal reaction conditions for the preparation of lignin-g-P(METAC) co-polymers for use as a flocculant in various applications were: pH=4.0, METAC/lignin molar ratio=1.6, Reaction time: 3 h, Temperature: 80° C., Lignin concentration=0.3 mol/L. The sample that was produced under these conditions was characterized using GPC, DLSA, FT-IR spectroscopy, H$^1$ NMR spectroscopy and TGA analysis. The charge density of this sample was 2.93 meq/g and its nitrogen content was 4.32 wt. %, which corresponded to a grafting ratio of 178.5%. This grafting ratio implies 64 wt. % METAC and 36 wt. % kraft lignin in the lignin-METAC copolymer. The charge density of this copolymer can be theoretically calculated using the nitrogen content from the elemental analysis of the copolymer, assuming that 1 mol of the quaternary ammonium groups attached to the lignin backbone has 1 eq charge density. The theoretical charge density of lignin-METAC with a 4.32 wt. % nitrogen content is 3.08 meq/g, which is close to that of the experimental value (2.93 meq/g) obtained using PCD analysis.

Example 2

Wet (44 wt. % moisture content) HRC softwood lignins from Mills X and Y as well as wet (35 wt. % moisture content) LRC softwood lignins from Mills X and Y were used in this Example. Both of these lignins were obtained from the FPInnovations lignin demonstration plant, Thunder Bay, Ontario which employs the LignoForce™ process. 80 wt. % in water [2-(Methacryloyloxy)ethyl] trimethylammonium chloride and potassium persulfate ($K_2S_2O_8$, ACS reagent >99.0%) were purchased from Sigma-Aldrich and used as received. The resulting effects on charge density, solubility and yield of the lignin-METAC copolymer were determined. These results were used to determine which type of lignin produced the lignin-METAC copolymer with the highest charge density, solubility and yield.

Lignin-METAC copolymers were synthesized by the addition of 2 g of lignin (based on dry weight) in a certain amount of water in a 250-mL three-neck glass flask. The pH of the medium was adjusted to 2, 4, 6, 8, 10 or 12 and a pre-determined amount of METAC was then added to the reaction mixture. The reaction mixture was then purged with $N_2$ for 30 min. Potassium persulfate (0.03 g) was then dissolved in 5 mL of deionized water and was added drop-wise to the reaction mixture to initiate the polymerization reaction. The total volume of the reaction medium was fixed at 40 mL, in which, the lignin concentration was 0.3 mol/L. The copolymerization was conducted at different temperatures (50-90° C.) for 1-8 h. A continuous supply of nitrogen was maintained throughout the reaction. After completion of the reaction, the solution was cooled down to room temperature and the solution was mixed with 200 mL of ethanol (80 vol. % in water) in order to precipitate the lignin-METAC copolymer. The resulting suspension was then centrifuged at 3500 rpm for 10 min and a sticky brown solid was isolated.

To investigate the repeatability of the lignin-g-P(METAC) preparation method of the invention and the performance of various lignins in the copolymerization, the production of lignin copolymer under the same conditions was investigated using different lignin samples. The overall mass balance for the production of lignin-g-P(METAC) from 8 different lignin samples is shown in Table 2. The 8 different types of lignin can be split into 3 different categories, wet (W) vs. dry (D), Mill X vs. Mill Y and HRC Lignin vs. LRC Lignin. Of the 3 different categories, there were small variations in results between wet vs. dry and between lignin extracted from two different Canadian mills (Mill X and Mill Y). Varying these factors had insignificant effects on charge density, molecular weight, residual METAC monomer, poly (METAC) and lignin-g-P(METAC) copolymer yield. However, the analysis showed better results when HRC Lignin was used compared with LRC Lignin. HRC Lignin generated a copolymer with a higher yield (71%) and solubility of 100%, while LRC lignin had a copolymer yield of 24% and a solubility of 20% (at 1 wt. % concentration). In addition, when HRC Lignin was used, 14% of the raw material was converted to homopolymer, whereas when LRC lignin was used, an average of 48% of the raw material was converted to the homopolymer.

TABLE 2

Effect of various lignin forms on product charge density, solubility and composition

| | Charge (meq/g) | Solubility* (%) | Product composition (%) | | | |
|---|---|---|---|---|---|---|
| | | | Copolymer | Homopolymer | Monomer | Lignin |
| LRC Lignin | | | | | | |
| Mill X Wet | 1.41 | 36 | 26 | 54 | 06 | 09 |
| Mill X Dry | 4.19 | 14 | 19 | 63 | 04 | 05 |
| Mill Y Wet | 2.52 | 10 | 20 | 39 | 15 | 18 |
| Mill Y Dry | 0.66 | 22 | 31 | 38 | 05 | 16 |
| HRC Lignin | | | | | | |
| Mill X Wet | 1.70 | 100 | 67 | 06 | 13 | 13 |
| Mill X Dry | 2.68 | 100 | 73 | 17 | 06 | 03 |
| Mill Y Wet | 1.34 | 100 | 69 | 18 | 04 | 05 |
| Mill Y Dry | 2.09 | 100 | 75 | 16 | 07 | 02 |

*Based on a 1% wt. solution

Example 3

Figure 6A:
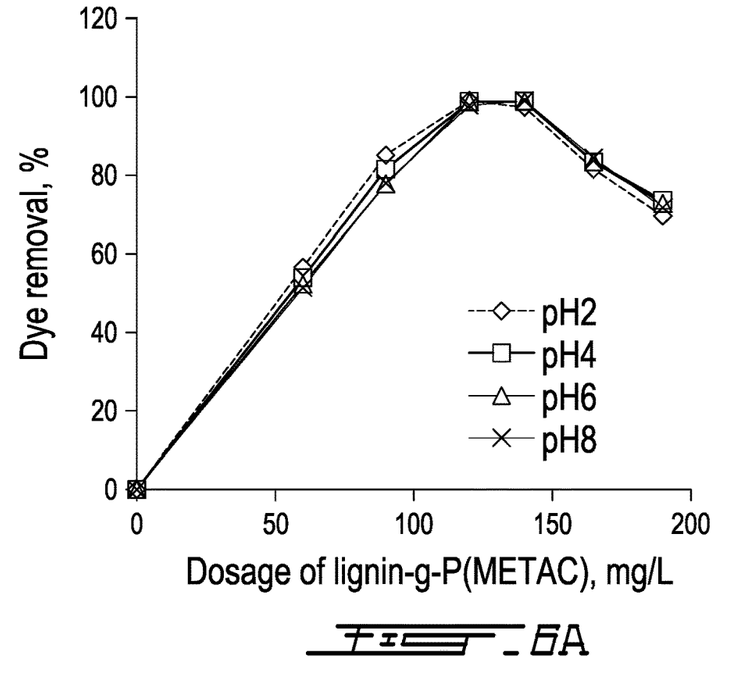
FIG. 6(A) is a graph of dye removal (%) versus dosage of Lignin-g-P(METAC) (mg/L) and the effect of pH on the removal of dye RB5 (A) from dye solution (concentration of dye: 100 mg/L)
Figure 6B:
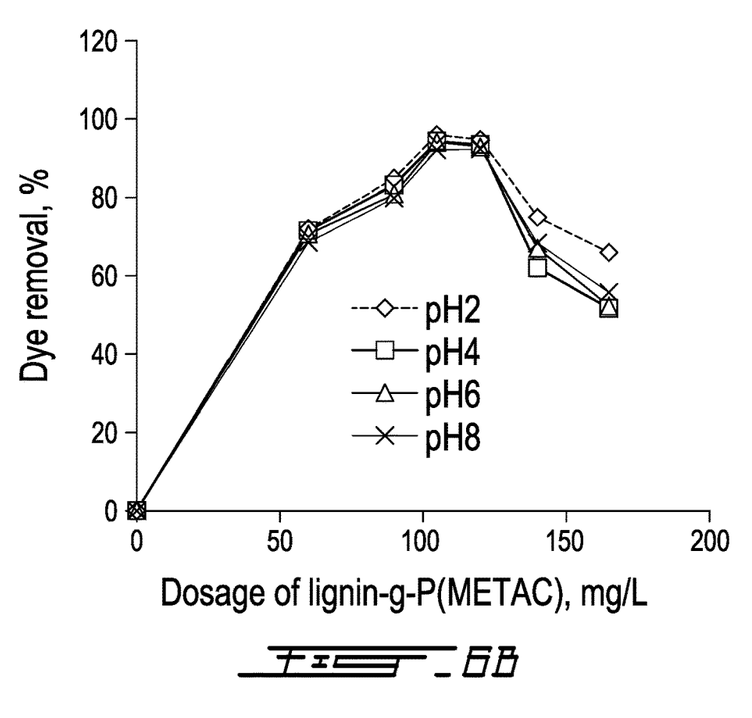
FIG. 6(B) is a graph of dye removal (%) versus dosage of Lignin-g-P(METAC) (mg/L) and the effect of pH on the removal of dye RO16 (B) from dye solution (concentration of dye: 100 mg/L)
Figure 7A:
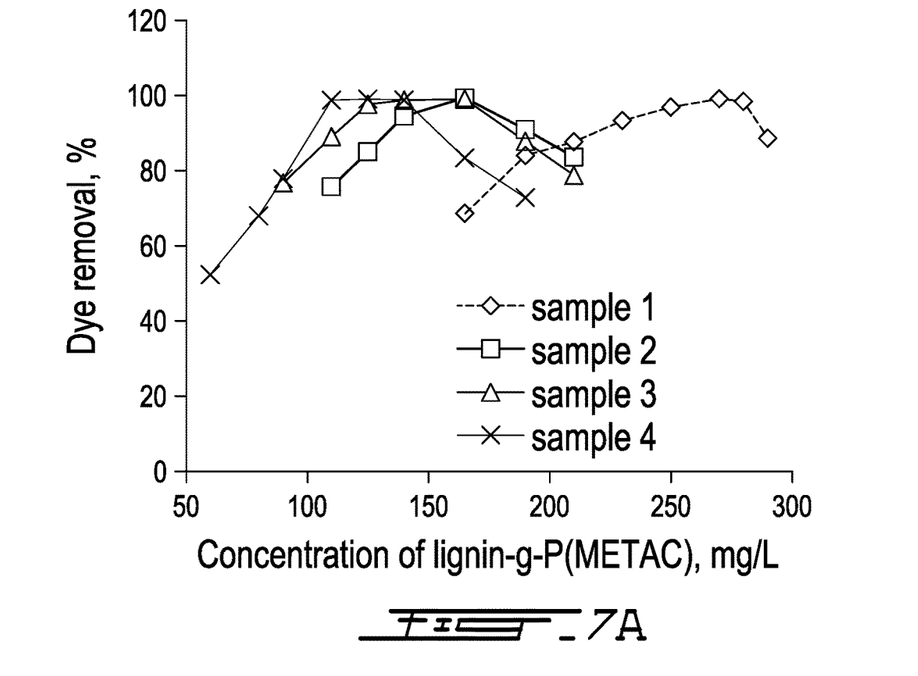
FIG. 7(A) is a graph of dye RB5 removal (%) versus dosage of Lignin-g-P(METAC) (mg/L) and effect of dye concentration on dye removal at pH 6 with Sample 1: $M_w=5.5\times10^5$ g/mol, charge=1.36 meq/g; Sample 2: $M_w=8.3\times10^5$ g/mol, charge=2.12 meq/g; Sample 3: $M_w=1.38\times10^6$, charge=2.67 meq/g; Sample 4: $M_w=1.65\times10^6$ mol/g, charge=2.93 meq/g.
Figure 7B:
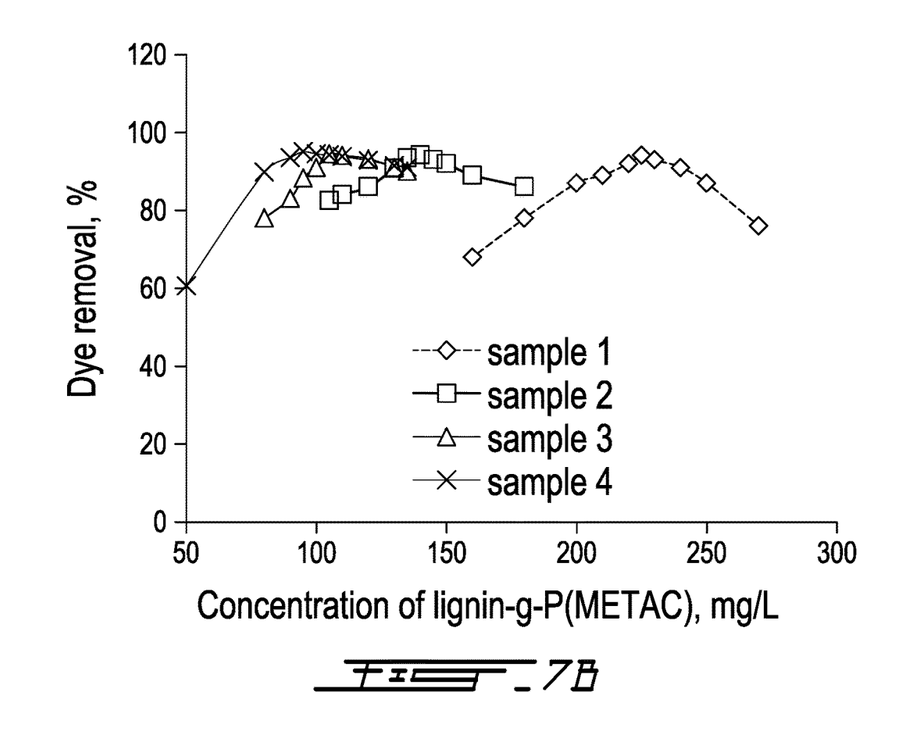
FIG. 7(B) is a graph of dye RO16 removal (%) versus dosage of Lignin-g-P(METAC) (mg/L) and effect of dye concentration on dye removal at pH 6 with Sample 1: $Mw=5.5\times10^5$ g/mol, charge=1.36 meq/g; Sample 2: $Mw=8.3\times10^5$ g/mol, charge=2.12 meq/g; Sample 3: $Mw=1.38\times10^6$, charge=2.67 meq/g; Sample 4: $Mw=1.65\times10^6$ mol/g, charge=2.93 meq/g.

The capability of lignin-g-PMETAC to act as flocculant at different pH values and charge densities was evaluated in two different simulated dye solutions (Reactive orange 16 (RO16) and Reactive Black 5 (RB5), and the results were compared with both CPAM (commercial source) and PMETAC generated under the optimal conditions for lignin-g-P(METAC). The flocculation of dye dissolved or suspended particles is a key step for treating wastewater from the textile industry and provides excellent proof on the flocculation capabilities of any given flocculant. The results showed that: 1) lignin-g-P(METAC) was an efficient flocculant (up to 99% removal for RB5 and 92% for RO16) and pH had no effect on its flocculation efficiency (see FIGS. 6A and 6B); 2) As the charge of the polymer increased, a lower dosage was required to achieve the same flocculation efficiency (see FIGS. 7A and 7B) and 3) lignin-g-P(METAC) generated comparable or better results compared to P(METAC) and CPAM (see FIGS. 8A and 8B).

Figure 8A:
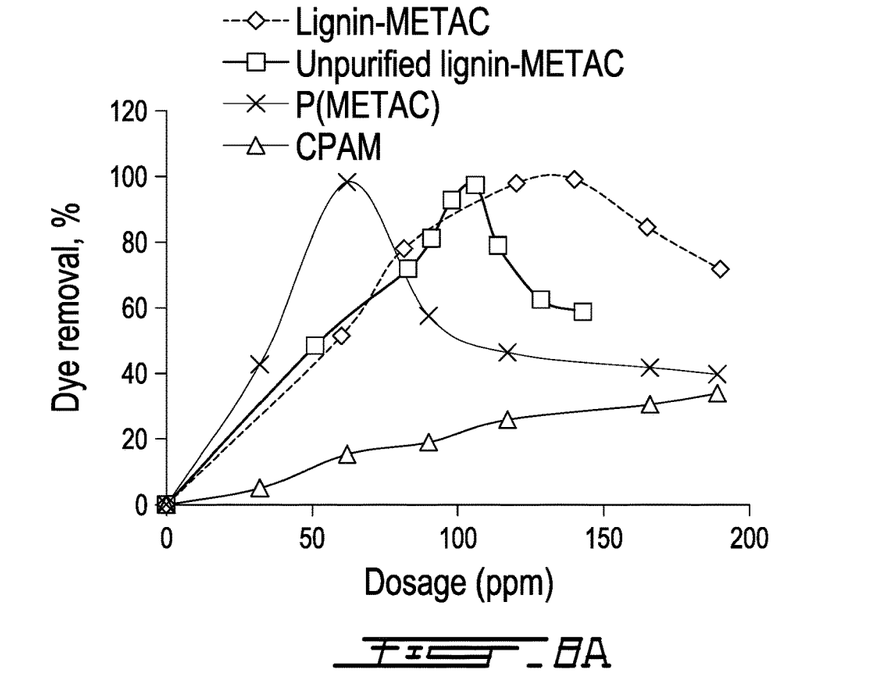
FIG. 8(A) is a graph of dye RB5 removal % (100 mg/L) versus dosage (ppm) of one of the four following compounds, lignin-g-P(METAC) (diamond), crude/unpurified lignin-g-P(METAC) (square with max at a dosage ~105 ppm), P(METAC) (square with max at a dosage ~65 ppm) and CPAM (triangle)
Figure 8B:
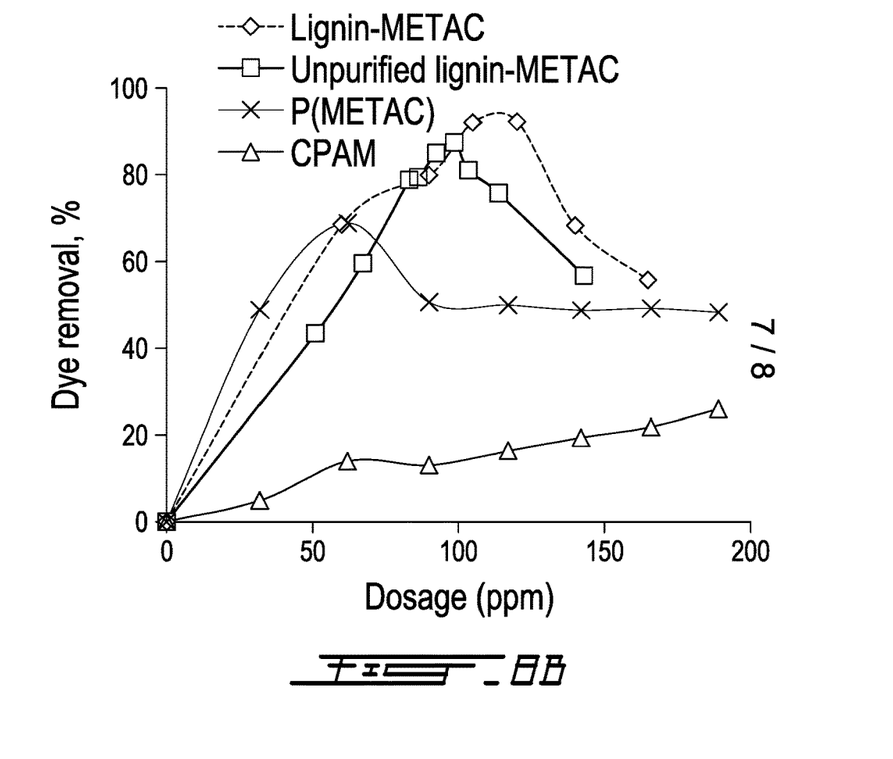
FIG. 8(B) is a graph of dye RO16 removal %(100 mg/L) versus dosage (ppm) of one of the four following compounds, lignin-g-P(METAC) (diamond), crude/unpurified lignin-g-P(METAC)(square with max at a dosage ~95 ppm), CPAM (square lowest curve, rising to a max. at 190 ppm) and P(METAC) (triangle)

To evaluate the impact of the purity of lignin-g-P (METAC) copolymer product on its efficiency as a flocculant, two different scenarios were assessed in FIG. 8: 1) lignin-g-P(METAC) was precipitated from the reaction medium in ethanol and 2) the lignin-g-P(METAC) copolymer was used without any purification (i.e. the reaction medium was used as the final product). The results showed that for RB5, a dosage of 106 ppm of unpurified lignin-g-P(METAC) was required to flocculate 99% of the dye, whereas 140 ppm of purified lignin-g-P(METAC) copolymer was needed to achieve the same result. In the case of RO16, 98 ppm of unpurified lignin-g-P(METAC) was required to remove 87% of the dye, whereas 105 ppm of purified lignin-g-P(METAC) was needed to remove 92% of the dye. These results suggest that: 1) an impure lignin copolymer would produce better results as it contains lignin-g-P(METAC) copolymer, unreacted METAC monomer and poly (METAC) homopolymer, 2) purification can be eliminated if it is not necessary, which can reduce the cost of production, and 3) the process can be designed to produce different levels of purity (at different production costs) depending on the end use applications.

Example 4

The dewatering efficiency of lignin-g-P(METAC) was evaluated using secondary sludge from a kraft mill. After centrifugation of sludge at 90 g, the solids content of sludge that was treated with 5000 ppm (based on solids content) of lignin-g-P(METAC) reached 14 wt. % solids from an initial 2 wt. % solids, which was comparable to the results obtained for treating the sludge with the expensive homo polymer P(DADMAC). However, the treatment of the sludge with 5000 ppm of CPAM led to only 10 wt. % solids content. The residual turbidity and COD of the filtrate after the treatment with lignin-g-P(METAC) were comparable with those for the sludge treated with P(DADMAC).

Example 5

Managing tailings resulting from oil sands mining operations, or solids suspensions from other industrial processes, continues to be a major environmental concern. In the absence of a solution to the oil sands tailings management problem, a zero discharge approach is typically used by the oil sands industry whereby the tailings suspensions are held in large holding ponds for long periods of time. In doing so, a portion of the suspended solids is settled in the tailings ponds generating a relatively thin layer of clear supernatant at the top of the ponds which could either be reused in the process or could be discharged to the receiving water bodies. Often, particle settling is enhanced by using petroleum-derived coagulants and/or flocculants albeit with limited success. There is a strong need to develop novel polymers, which are better suited for difficult applications such as the one facing the oil sands industry.

Figure 9:
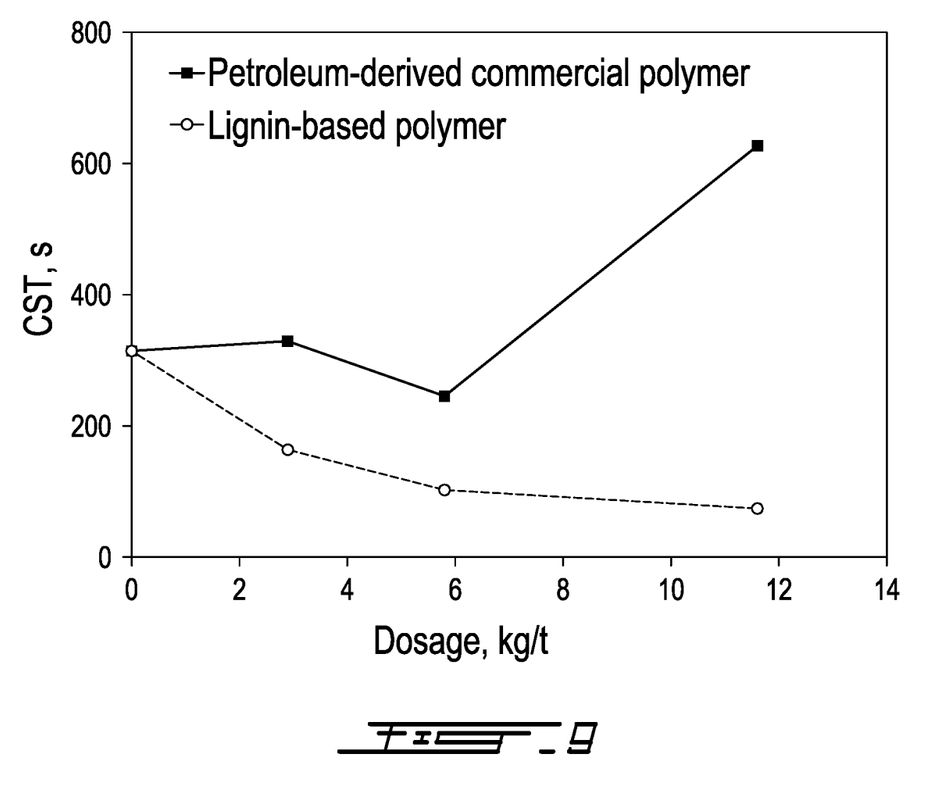
FIG. 9 is a graph of the effect of dosage of lignin-g-P (METAC) copolymer and petroleum-based polymer versus capillary suction time (CST) (kg/t) of tailings from oilsands mining operations.

Our laboratory experiments showed that the lignin-derived cationic polymer lignin-g-P(METAC) of this invention performed better than a commercially used petroleum-derived polymer (CPAM) when treating an oil sands tailings sample. FIG. 9 shows the capillary suction time (CST) obtained for the commercial and the lignin-derived polymers. As clearly shown in this figure, the lignin-derived polymer resulted in lower CST values at all applied polymer dosages compared to the petroleum-based polymer. Those skilled in the art know that lower CST values indicate superior performance. The capillary suction time (CST) test is a commonly used method to measure the filterability and the easiness of removing moisture from slurries and sludge in numerous environmental and industrial applications. One may thus conclude from these data that the lignin-derived polymers of this invention could outperform the commercially available petroleum-based polymers in terms of coagulating/flocculating solid particle suspensions from the oil sands industry.

Example 6

In one set of experiments, unwashed wet kraft softwood lignin was received from a kraft pulp mill and used as is for producing cationic lignin-based polymer. This experiment was conducted at different pH levels in the acidic range under the following conditions: DMC/lignin mass ratio of 2, $Na_2S_2O$ concentration of 1.5% (based on mass of lignin), 50 g/L lignin concentration, 80° C. for 3 h. The lignin polymer was then purified by mixing the solution of the reaction products with ethanol (80 vol. %). Table 3 lists the charge density and solubility of the produced cationic lignin polymer. It is seen here that, as the pH of the reaction medium is reduced, the cationic lignin polymer has a higher charge density and solubility.

TABLE 3

Effect of pH of the reaction medium on the charge density and solubility of the product cationic lignin-based polymers

| Sample | pH | Solubility, (%) | Charge density, (meq/g) |
| --- | --- | --- | --- |
| DMC-g-KL1 | 1.5 | 90 | 2.48 |
| DMC-g-KL2 | 2.0 | 76 | 2.20 |
| DMC-g-KL3 | 3.0 | 50 | 0.89 |
| DMC-g-KL4 | 4.0 | 35 | 1.21 |
| DMC-g-KL5 | 5.0 | 44 | 1.09 |

Figure 10:
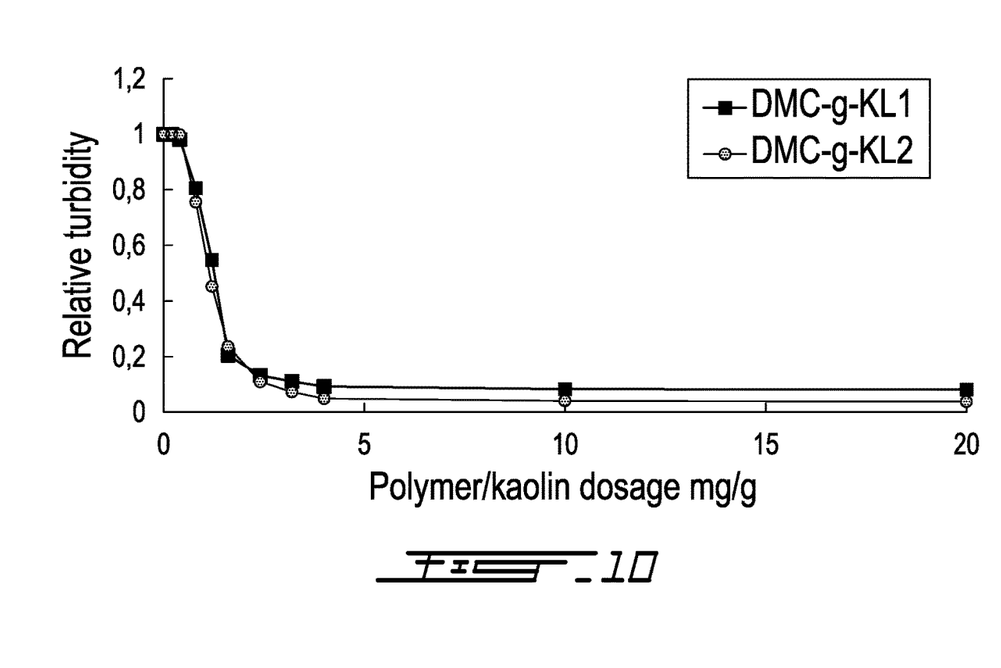
FIG. 10 is a graph of relative turbidity of kaolin suspensions as a function of lignin-based cationic polymer dosage (mg/L).

Two of the products of these reactions were used as flocculants for kaolin suspensions. This experiment was conducted using a photometric dispersion analyzer under the conditions of 2.5% kaolin suspended solids, pH 6 and 300 rpm. FIG. 10 shows the relative turbidity of the kaolin suspension as a function of lignin polymer dosage after 15 min of experiment.

It is clearly seen that the relative turbidity for both lignin samples dropped by more than 90%, which shows their excellent flocculation performance.

Example 7

In this set of experiments, 3 cationic monomers, namely: [3-(Methacryloylamino)propyl] trimethylammonium chloride (MAPTAC), [2-(Acryloyloxy)ethyl]trimethyl ammonium chloride (ATAC) and [2-(Methacryloyloxy)ethyl] trimethyl ammonium methyl sulfate (METAM) were used for producing cationic lignin polymers under the conditions of Example 6, but at 600 g/L lignin concentration (rather than at 50 g/L). The cationic lignin products were separated from homopolymers via ethanol treatment. Table 4 provides the properties of the cationic lignin products.

TABLE 4

Properties of cationic lignin-based polymers

| Sample | KL-MAPTAC | KL-ATAC | KL-METAM |
| --- | --- | --- | --- |
| Charge density, meq/g | +3.33 | +3.06 | +3.40 |
| Solubility, wt. % | 85 | 87 | 93 |
| Nitrogen, wt. % | 3.45 | 3.14 | 2.5 |
| $M_w$, g/mol | $1.2 \times 10^6$ | $657 \times 10^3$ | $824 \times 10^3$ |
| $M_n$, g/mol | $221 \times 10^3$ | $221 \times 10^3$ | $187 \times 10^3$ |
| $M_w/M_n$ | 5.4 | 2.9 | 4.3 |

Figure 11:
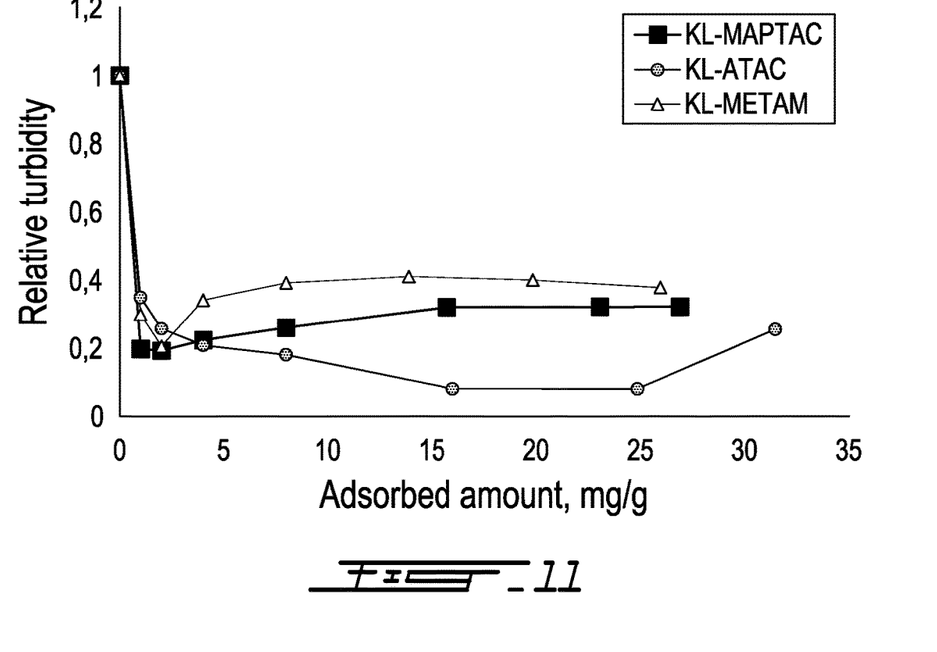
FIG. 11 is a graph of relative turbidity of kaolin suspensions as a function of lignin-based cationic polymer adsorbed on kaolin particles (mg/g).

As seen in Table 4, the three cationic lignin-based polymers had a high charge density of >3 meq/g and more than 600 kg/mol molecular weights. Their water solubility was also more than 80% at 10 g/L concentrations. The nitrogen content of the polymers confirmed that the polymerization reaction took place as planned. These products were also used as flocculants for a kaolin suspension as shown in FIG. 11. In this figure, the relative turbidity of the suspension was plotted as a function of lignin-based polymers adsorbed on the kaolin particles (determined by mass balance). Under the experimental conditions described in Example 6, it is evident that all three cationic lignin-based polymers functioned as effective flocculants with slightly different performance characteristics.

The invention claimed is:

1. A method for preparing a cationic lignin copolymer comprising:
    providing water;
    providing a kraft lignin;
    providing at least one monomer compound, wherein the monomer compound is a cationic amine compound; and
    mixing the water, the lignin, and the at least one monomer compound under acidic free radical generating conditions, to polymerize the lignin and at least one monomer compound in aqueous suspension and to produce the cationic lignin copolymer;
wherein the cationic amine compound is selected from the group consisting of: N,N-dimethyldiallyl ammonium chloride (DADMAC); N,N'-methylenebisacrylamide; [2-(Methacryloyloxy)ethyl] trimethylammonium chloride (METAC), [3-(Methacryloylamino)propyl] trimethylammonium chloride (MAPTAC), [2-(Acryloyloxy)ethyl] trimethyl ammonium chloride (ATAC) and [2-(Methacryloyloxy)ethyl] trimethyl ammonium methyl sulfate (METAM), and
    wherein the cationic lignin copolymer is a flocculant having a molecular weight of $1.3 \times 10^6$ to $1.5 \times 10^6$ g/mol,
    wherein the cationic lignin copolymer is produced free of oxidizing enzymes.

2. The method of claim 1, further comprising separating and purifying reaction products comprising the water soluble lignin copolymer.

3. The method of claim 2, wherein the separating and purifying of the reaction products is by nanofiltration and/or ultrafiltration.

4. The method of claim 3, wherein a recovery of the cationic lignin copolymer is greater than 80% in the nanofiltration and/or ultrafiltration.

5. The method of claim 1, wherein the cationic lignin copolymer comprises comonomers selected from the group consisting of methyl methacrylate, acrylamide, vinyl acetate, and combinations thereof.

6. The method of claim 5, wherein the cationic amine compound is [2-(Methacryloyloxy)ethyl] trimethylammonium chloride (METAC).

7. The method of claim 1, wherein the acidic free radical generating conditions are in aqueous solution with an acid and at least one of a free radical initiator, a UV light, and microwaves.

8. The method of claim 7, wherein the free radical initiator is sodium persulphate or potassium persulphate.

9. The method of claim 1, wherein the pH of the acidic free radical generation conditions is from 2 to 7.

10. The method of claim 9, wherein the pH is 3 to 4.

11. The method of claim 1, wherein the lignin is an acid washed low residual content lignin or an unwashed high residual content lignin.

12. The method of claim 11, wherein the lignin is the unwashed high residual content lignin.

* * * * *